Nov. 16, 1948.  W. F. DONKIN  2,453,835
BATTERY HANDLE AND HOLD-DOWN BRACKET

Filed Aug. 21, 1946  2 Sheets-Sheet 1

INVENTOR.
WILLIAM F. DONKIN
BY
Kwis, Hudson, Baighton & Williams
ATTORNEYS

Nov. 16, 1948.  W. F. DONKIN  2,453,835
BATTERY HANDLE AND HOLD-DOWN BRACKET
Filed Aug. 21, 1946  2 Sheets-Sheet 2
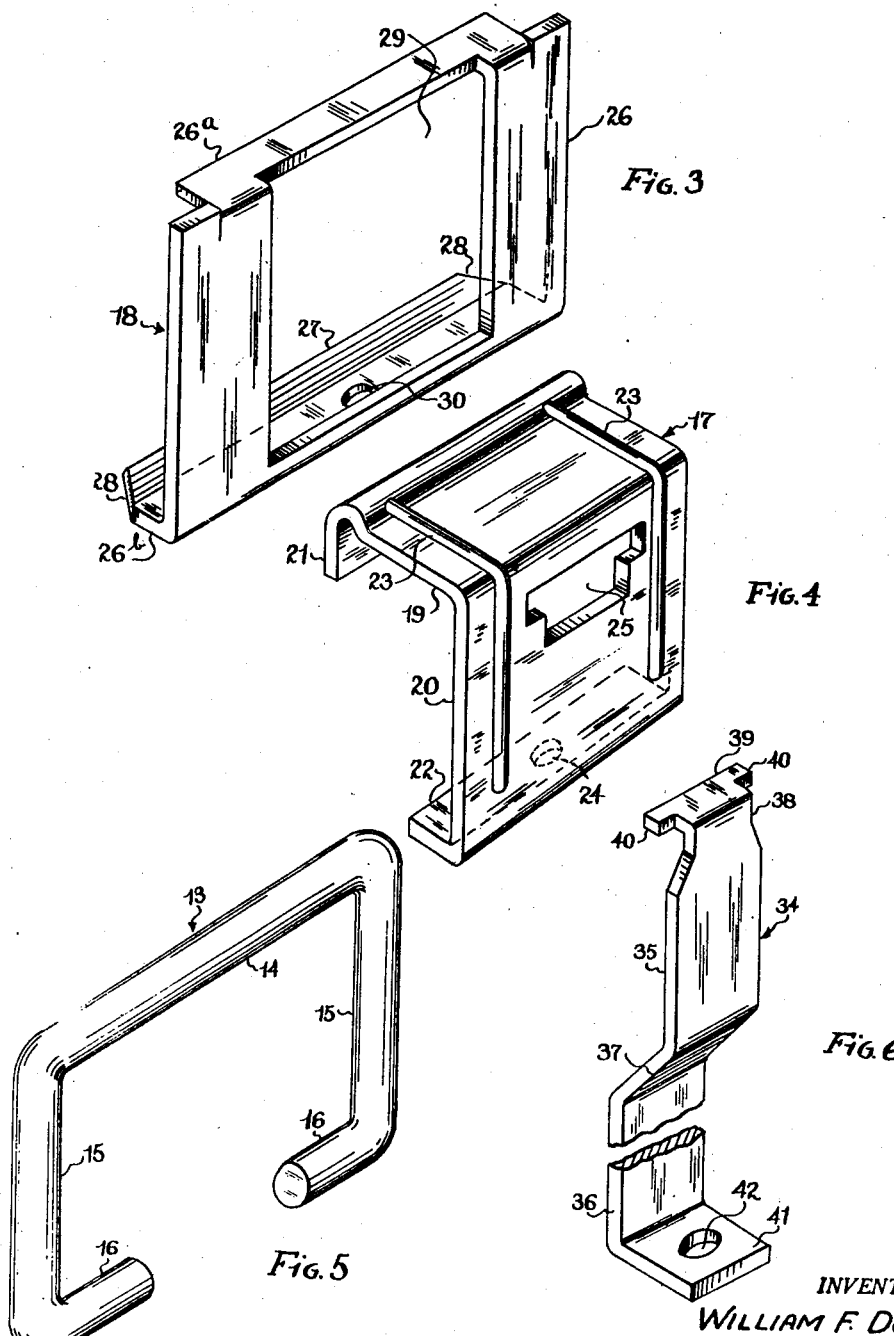
INVENTOR.
WILLIAM F. DONKIN Patented Nov. 16, 1948

2,453,835

UNITED STATES PATENT OFFICE 2,453,835

BATTERY HANDLE AND HOLD-DOWN BRACKET

William F. Donkin, Cleveland Heights, Ohio, assignor to Willard Storage Battery Company, Cleveland, Ohio, a corporation of West Virginia Application August 21, 1946, Serial No. 691,973

5 Claims. (Cl. 180—68.5)

1

This invention relates to handles for containers, and more particularly to retractible handles for storage batteries and which handles may include a hold-down bracket for the battery.

The containers of storage batteries are generally provided with finger-engaging recesses in or projections on the end walls to facilitate handling of the batteries. Such expedients are not entirely satisfactory since these recesses or projections are frequently not easily accessible when a battery is installed in a vehicle. Moreover, since batteries, especially the larger sizes designed for use in trucks or buses, are quite heavy, such recesses or projections do not provide sufficient purchase for the fingers so that handling of the batteries is extremely difficult. In an attempt to overcome these difficulties various types of handles have been devised. These prior devices have, however, very often required an alteration of the battery container, increased the overall height of the battery, or were subject to other limitations which greatly restricted their usefulness.

One of the principal objects of this invention, therefore, is the provision of an improved handle means or assembly which can be readily applied to containers, particularly storage battery containers, to provide a secure and convenient grip portion for handling the containers, the grip portion being retractible when not in use.

Another object of the invention is to provide an improved storage battery having retractible handles which can be easily extended to provide secure and convenient grip portions for handling the battery, the grip portions dropping to retracted positions when not in use, such that the overall height of the battery is not materially increased.

A further object of the invention is the provision of an improved retractible handle means or assembly for storage batteries or the like, the handle assembly being so constructed and arranged that a hold-down member may be readily applied thereto or removed therefrom.

A still further object of the invention is to provide an improved handle means or assembly for a storage battery or the like, the handle means comprising a bail-like grip portion and a clamping assembly, the clamping assembly being adapted to be detachably secured to a side wall of the battery container with a portion of the bail-like member slidably disposed between the clamping assembly and the container side wall.

An additional object of the invention is to provide an improved handle means of the type described in the preceding object with a detachable

2 hold-down bracket which can be readily applied to or removed from the clamping assembly of the handle means without removing the latter from the battery container.

It is also an object of the invention to provide an improved handle means for a storage battery, the handle means comprising a bail-like handle member and a two-part clamping assembly having one of its parts adapted to fit over the upper edge of a side wall of a container and its lower part adapted to engage a downwardly facing surface provided on the side wall of the container, the two parts of the clamping assembly being detachably secured together with the bail-like handle member having a portion slidably disposed between the clamping assembly and the side wall of the container to which it is attached.

Other objects and advantages of the invention reside in various features of construction, combination and arrangement of parts as will hereinafter become more clearly apparent from the following detailed description of the preferred embodiment shown in the accompanying drawings forming a part of this specification, and in which:

Fig. 3 is a perspective view of the lower member of the clamping assembly of the handle means illustrated in Fig. 1;

Fig. 4 is a perspective view of the upper member of the clamping assembly of the handle means illustrated in Fig. 1;

Fig. 5 is a perspective view of the bail-like handle member of the improved handle means; and Fig. 6 is a perspective view of a hold-down bracket which can be applied to the handle means or assembly as illustrated in Fig. 1.

Figures 1, 2:
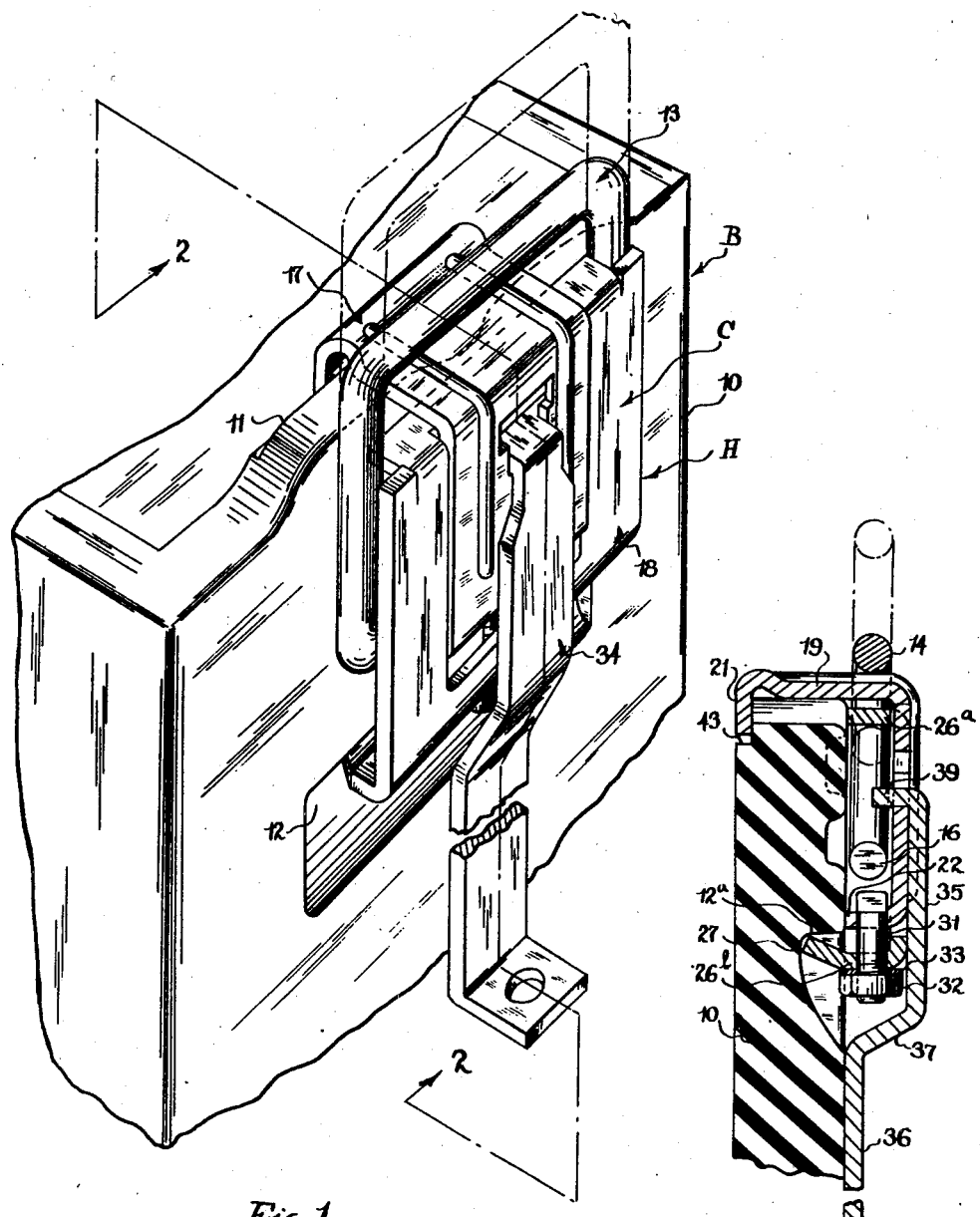
Fig. 1 is a perspective view of a portion of a storage battery illustrating the preferred embodiment of my improved handle means and hold-down bracket assembled and attached to the battery.
Fig. 2 is a sectional view taken substantially on the line 2—2 of Fig. 1.

Fig. 1 illustrates a portion of one end of a storage battery container, generally designated B, which is of conventional design and comprises a side wall 10, the upper edge of which is provided with an upstanding portion or shoulder 11 generally referred to as a "stub handle." The wall 10 is further provided with a recess 12 forming a downwardly facing surface or shoulder 12a for engagement by the fingers of an individual. The handle means or assembly, generally designated H, is applied to the wall 10 of the battery container B in the manner shown in Fig. 1, and a like handle means or assembly may also be applied to the opposite wall of the battery which is not here illustrated.

The handle assembly H of this invention comprises a bail-like handle member 13, which may be formed from round metal stock, and is preferably shaped as a substantially open rectangle as shown in Fig. 5. This handle member 13 includes an upper or grip portion 14, depending side portions 15, and inturned end portions 16. The assembly H further comprises a two-part clamping assembly, generally designated C, composed of an upper or lock member 17 and a lower or lift portion 18, for attaching the handle member 13 to a side wall 10 of the container.

The upper clamp member 17 (see Fig. 4) comprises a top portion 19 and a side portion 20 extending at substantially right angles to each other and united by a curved portion of relatively small radius. The outer end of the top portion 19 is provided with a down-turned flange 21, and the lower end of the side portion 20 is provided with an inturned flange 22. The width of the flange 22 is slightly greater than the diameter of the handle member 13 for a purpose hereinafter described. The clamp member 17 is preferably formed from flat metal stock which is stamped, rolled, pressed or otherwise shaped, substantially as shown in Fig. 4, and may be provided with strengthening ribs, such as 23. A hole 24 is provided at substantially the center of the flange 22 for receiving a means to connect it to a cooperating flange on the lower clamp member 18 in a manner hereinafter described. The side portion 20 of the clamp 17 is also provided with a T-shaped cutout or opening 25 for receiving the upper end of a hold-down bracket.

The lower member 18 (see Fig. 3) of the clamp assembly comprises a main body or side plate 26, the upper end of which is provided with an inturned, flanged portion 26a, each end of which is cut away for a distance substantially equal to the diameter of the side portions 15 of the handle member 13. The lower portion of the clamp member 18 has a substantially horizontally extending flange 26b, the inner end of which is bent angularly upwardly to provide a portion 27 for engagement within the recess 12 on the side of the wall 10 of the battery container B. To facilitate the insertion and firm engagement of this portion 27 within this recess, the ends of the portion 27 are angularly cut away as indicated at 28. The main body or side plate portion 26 of the clamp member 18 is provided with a substantially rectangular opening 29 having a width slightly greater than the width of the upper clamping member 17, this cutout portion 29 being adapted to receive the side portion 20 and the horizontal flange 22 of the upper clamp member 17. A hole 30 is formed centrally of the lower flange 26b of the lower clamp member 18 for receiving a machine bolt 31 which is adapted to pass through the hole 30 and the aligned hole 24 of the upper clamp member to secure the two portions of the clamp together, in the manner illustrated in Fig. 2. The lower end of the bolt 31 is threaded and provided with a nut 32 for drawing the two members of the clamping assembly together, as will be hereinafter described in detail. A lock, or other type, washer 33 may be interposed between the lower surface of the flange 26b of the clamp member 18 and the nut 32 to prevent the latter from loosening.

The assembly and attachment of the improved handle means to a battery may be briefly summarized as follows:

The upper clamp member 17 is assembled with the lower clamp member 18 by inserting the flange 22 and the side portion 20 of the member 17 in the rectangular opening 29 of the member 18 in the manner illustrated in Figs. 1 and 2. The machine bolt 31, or other fastening means, is then inserted through the aligned holes 24 and 30 of the clamping members 17 and 18, and a suitable washer 33 and nut 32 are applied to the lower end of the bolt. The handle member 13 is then disposed with its inturned ends 16 within the space provided between the upper flange 26a of clamping member 18 and the lower flange 22 of clamping member 17. The handle 13 and clamp assembly C are next applied to the side wall 10 of the battery container B by fitting the flange 21 of the upper clamp 17 over the top of the upstanding shoulder or stub handle 11 of the battery. If desired, the inner surface of this shoulder or stub handle 11 may be rabbeted or grooved as at 43 to receive the flange portion 21. This is not, however, necessary since suitable engagement may be secured without forming a special surface, such as 43 upon the shoulder 11. Since the nut 32 has not yet been tightened, the two clamp members 17 and 18 will be extended sufficiently so that the inwardly and upwardly turned flange 27 may be easily inserted within the recess 12 of the battery B and the flange 21 engaged over the top of wall 10. The nut 32 is then tightened, thus drawing flanges 22 and 26b of the members 17 and 18, respectively, towards each other with the result that the upwardly and inwardly turned flange 27 firmly engages the shoulder 12a of recess 12, and the upper clamp member 17 is drawn downwardly into firm engagement with the top of the shoulder 11, the flange 21 of the said clamp member being in engagement with the inward face of the said shoulder 11.

It will be noted that the inner edge of the flange 22 on the clamping member 17, and the inner edge of flange 26a on clamping member 18, are now in engagement with the outer side wall 10 of the battery B, thus defining the spacing between the clamp assembly and the side wall. The handle member 13 can, therefore, freely slide from its retracted or lower position, as illustrated in full lines in Figs. 1 and 2, to its extended or upper position, illustrated by broken lines in the same figures. When so extended, the grip portion 14 of the handle 13 may be easily engaged by the individual's hand and a strong handle is thereby provided for lifting and transporting the battery, the inturned ends 16 of the lower end of the handle member 13 then being in engagement with the undersurface of the inturned flange 26a of the clamping member 18. When the handle 13 is released, it will freely drop to the full line position indicated in Figs. 1 and 2 where it is out of the way and does not extend an appreciable distance above the top of the battery.

In Fig. 6 there is illustrated a hold-down bracket member, generally designated 34, which may be readily applied to the handle assembly H. This hold-down bracket comprises an integral piece of metal stock having two offset vertical portions 35 and 36 united by an angularly extending portion 37 (see Fig. 2). The upper portion of the vertical section 35 has a region 38 of reduced width which is bent at right angles to the portion 35 so as to form a substantially horizontally extending flange 39, the outer end of which is provided with laterally directed extensions 40. Therefore, the flange 39 of the hold-down bracket 34 has a substantially T-shape and is adapted to be slid into the opening 25 of the clamp member 17 of the handle assembly and interlocked therewith in a well-known manner. The lower end of the vertical portion 36 of the hold-down bracket 34 is provided with a substantially horizontally extending flange 41 having an opening or hole 42 for receiving a bolt or fastening means.

After the handle assembly H has been applied to a battery, as described above, the hold-down bracket 34 may be easily attached thereto by inserting the flange 39 thereof through the upper portion of the opening 25 in clamp member 17 and then seating the reduced portion 38 of the hold-down bracket 34 in the bottom of the T-shaped slot 25 of the member 17. It will be observed that the angular portion 37 is of such a dimension that the vertical portion 36 of the hold-down bracket can engage the side of the battery B when the bracket is thus attached to the handle assembly, thereby providing additional support for rigidly retaining the battery when it is clamped by fastening means inserted through the opening 42 in the lower flange 41 of the hold-down bracket.

As previously mentioned, an identical handle assembly H is provided for each end of a battery and these assemblies may be easily attached to or removed from battery containers as usually constructed without the necessity of altering the container. It will be apparent that it is not necessary that the side wall of the container have a recess therein to receive the flange 27 so long as there is a suitable downwardly facing surface on the side wall under which this flange may be engaged. In the event the battery casing or container does not have upstanding shoulders on, and recesses in, its end walls, the improved clamp may be employed by forming suitable grooves in and/or projections on the end walls for receiving the flanges 21 and 27 of the clamping assembly. The handle assembly H may be employed with or without a hold-down member or bracket such as 34, since the latter can be easily applied or removed as desired. Moreover, conventional hold-down brackets may be employed with this handle assembly by attaching the said hold-down brackets between the nuts 32 and the lower surfaces of flanges 26b on the clamp members 18.

The parts of the handle assembly and the hold-down clamp are preferably formed of iron, steel or other suitable metal and are lead coated to resist corrosion. However, it will be apparent that corrosive resistant alloys could be employed for constructing the handle assembly and/or hold-down bracket and thereby eliminate the lead coating.

Other modifications and adaptations of the apparatus herein disclosed may be made without departing from the invention and it is desired to particularly note that while the improved handle assembly has been illustrated as applied to a storage battery, its use is not limited thereto but may be employed with any container having a recess in the side wall and an upstanding edge on the said wall, or which may be provided with recesses and/or shoulders. Therefore, the invention is not limited to the exact constructions herein illustrated and described but only by the spirit and scope of the appended claims.

Having thus described my invention, I claim:

1. A removable handle for a container having a side wall provided with a downwardly facing surface, comprising a first clamping member having two angularly extending portions, a flange at the end of each of said portions, one portion of the clamping member and its flange being adapted to be engaged over the top of the container side wall, the other portion of said clamping member being adapted to extend in substantially parallel relationship to the outer face of said container side wall with the edge of the flange of said other portion in contact with the said side wall, a handle member having a grip portion adapted to extend above the first-mentioned portion of said clamping member and having inturned ends adapted to be slidingly received in the space between the said container side wall and the second portion of said clamping member, a second clamping member having a portion adapted to engage the said downwardly facing surface of the container side wall, and means for detachably securing the said clamping members together.

2. A handle assembly for a storage battery container having a side wall with an upstanding shoulder at the top and a recess in the outer face thereof, comprising a clamping member having a flange portion at its lower end adapted to be engaged in the said recess, the body of said clamping member being adapted to extend upwardly adjacent the outer face of the said side wall and spaced therefrom, the body of said clamping member having a substantially rectangular opening therein, a second clamping member having two angularly extending portions, one of said angularly extending portions being adapted to be engaged over said shoulder at the top of the side wall and the other of said angularly extending portions having a flange at the lower end adapted to extend through the said opening in the first-mentioned clamping member, a bail-like handle member having a grip portion adapted to be disposed above the first of said angularly extending portions of the second-mentioned clamping member and a lower portion of said handle member being adapted to be slidably received in the space between said side wall and the said clamping members, and means for detachably securing the said flanges together.

3. An assembly as defined in claim 2 and further comprising a hold-down bracket, the second-mentioned clamping member and the said hold-down bracket being provided with interlocking means for detachably securing the hold-down bracket to the handle assembly.

4. A handle assembly for a storage battery container having a side wall with an upstanding shoulder at the top and a recess in the outer face thereof, comprising a clamping member including a main body portion and a flange at each end thereof, one of said flanges being adapted to be engaged in said recess and the other of said flanges being adapted to engage the side wall adjacent the top thereof for disposing the body portion substantially parallel to and spaced from the said side wall, the said body member having an opening therein intermediate said flanges, a second clamping member including two angularly extending portions and a flange at the end of each of the angularly extending portions, one of said angularly extending portions and its flange being adapted to be engaged over the top of said shoulder on the side wall, the flange on the other of said angularly extending portions being adapted to pass through the opening in the first-mentioned clamping member and extend into contact with the container side wall adjacent the recess-engaging flange of the first-mentioned clamping member, a bail-like handle member including a grip portion adapted to extend above the said clamping members and a lower portion adapted to be received in the space between the container side wall and the clamping members, and a bolt adapted to pass through aligned openings in the adjacent flanges of the clamping members to secure the latter together in clamping relationship on the container side wall.

5. A handle assembly as defined in claim 4 and further comprising a hold-down bracket having a T-shaped flange at its upper end, the second-mentioned clamping member having a T-shaped opening therein for detachably receiving the said flange on the hold-down bracket.

WILLIAM F. DONKIN.

REFERENCES CITED

The following references are of record in the file of this patent:

UNITED STATES PATENTS

| Number | Name | Date |
|---|---|---|
| 1,867,632 | Roche | July 19, 1932 |